April 19, 1966  R. M. MORRIS  3,246,513
CONTAINER GLUABILITY TESTER
Filed Dec. 31, 1962  2 Sheets-Sheet 1
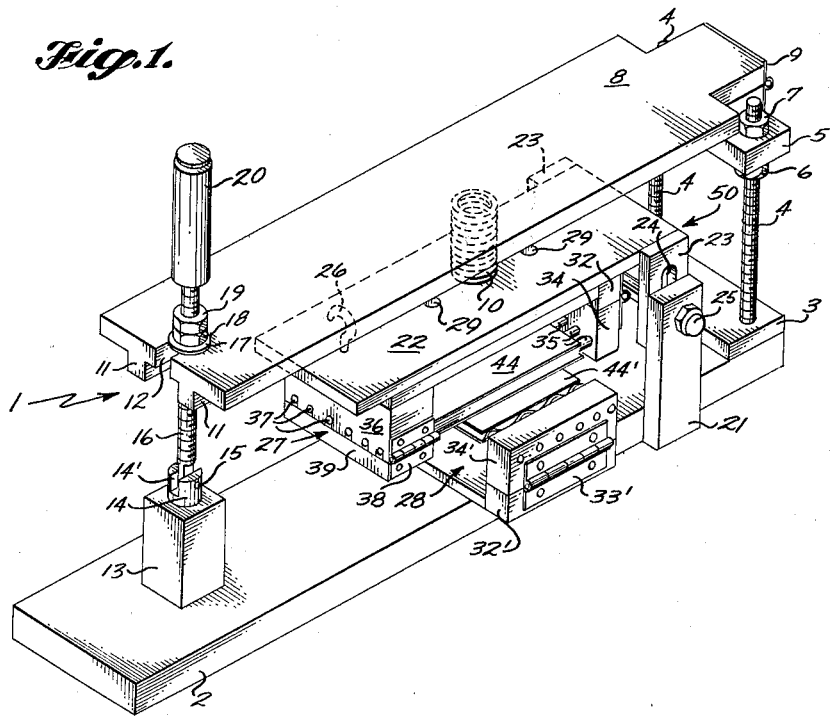
INVENTOR.
RICHARD M. MORRIS
BY
ATTORNEYS April 19, 1966 R. M. MORRIS 3,246,513
CONTAINER GLUABILITY TESTER
Filed Dec. 31, 1962 2 Sheets-Sheet 2
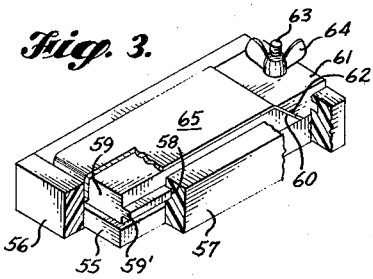
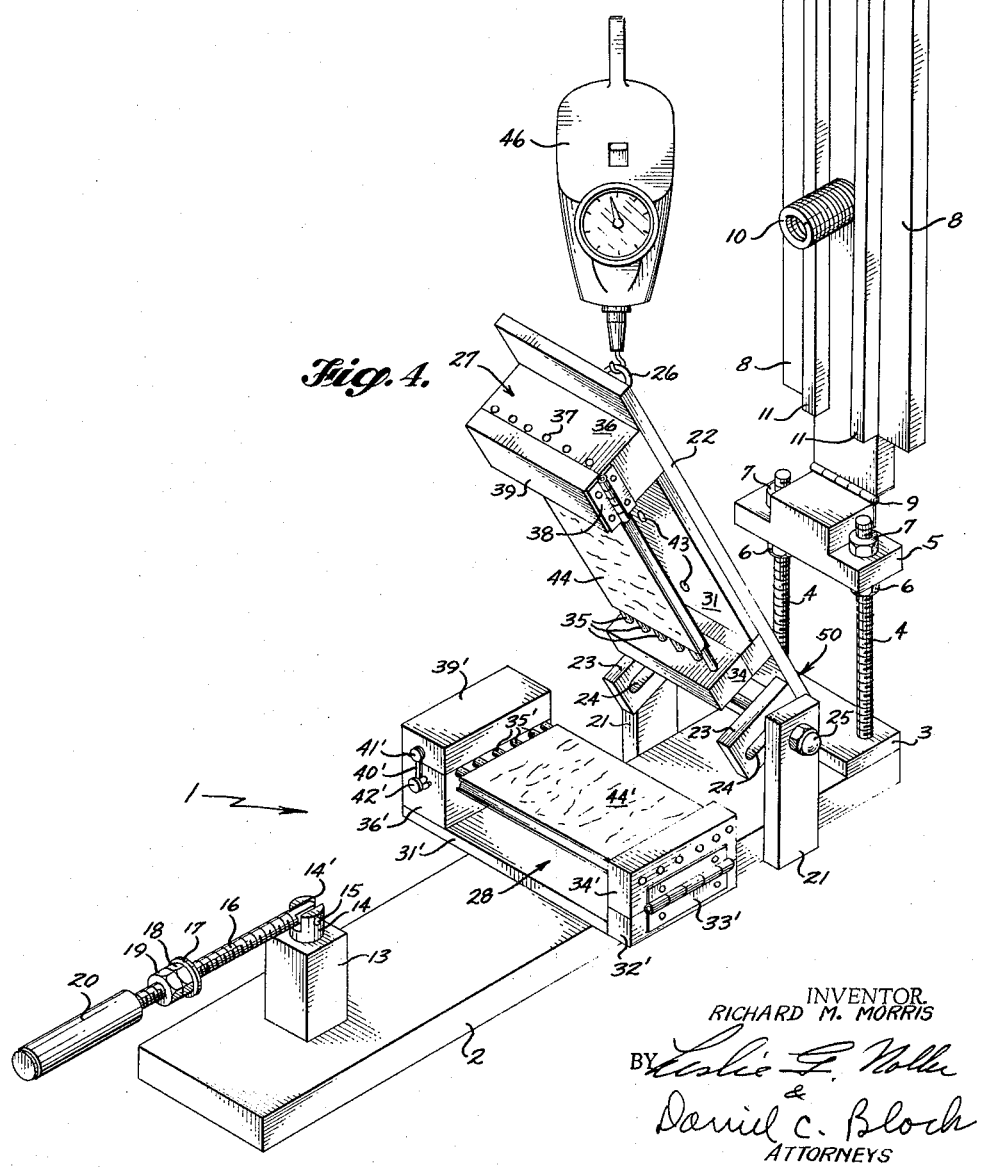
INVENTOR.
RICHARD M. MORRIS
BY
ATTORNEYS

United States Patent Office 3,246,513
Patented Apr. 19, 1966

3,246,513
CONTAINER GLUABILITY TESTER
Richard M. Morris, Longview, Wash., assignor to Weyerhaeuser Company, Tacoma, Wash., a corporation of Washington
Filed Dec. 31, 1962, Ser. No. 248,470
2 Claims. (Cl. 73—150)

This invention relates to a device for testing the properties of container board to determine whether two pieces of board can be glued together with conventional adhesives under standard conditions. More specifically, this invention relates to a portable testing device that is light-weight and is capable of accurately measuring the force required to pull apart two pieces of container material that are glued together.

In the distribution of goods placed in containers, it is the common practice to stamp a container blank and then assemble the container with the goods therein by properly gluing the end, top, and side flaps together. It is of particular interest to the distributor that the containers remain assembled until such time as the goods are sold and ultimately used by the consumer. This requires that a good grade of container board be used that can receive a proper amount of adhesive placed on the various flaps to hold the container assembled.

Heretofore, it has been the practice for a salesman of containers to show a prospective buyer a composite list of statistical data indicating the gluability properties of the container board, which will indicate the stability of the assembled container.

This practice has proved to be very unsatisfactory because some salesmen tend to exaggerate or "puff" the gluability properties and stability of their container and mislead the buyer.

It is a principal object of this invention to provide an apparatus for testing the gluability properties of container board used in making containers.

Another object of this invention is to provide an apparatus for accurately testing and demonstrating the gluability properties of container board used in making containers.

An object of this invention is to provide a portable tester for use in demonstrating the gluability properties of container board used in making containers.

These and other objects and advantages will become manifestly clear to those skilled in the art when taken in conjunction with the detailed description and drawings, wherein:

FIGURE 1 is a perspective view of the gluability tester in an assembled condition.

FIGURE 2 is a perspective view, partly in section, of one of the sample holders.

FIGURE 3 is a perspective view, partly in section, of another sample holder.

FIGURE 4 is a perspective view of the tester after the sample has been forced apart.

Referring to the drawings, the gluability tester is designated at 1 and is shown in FIGURE 1 in an assembled condition.

The gluability tester 1 comprises a base plate 2 having an enlargement 3 at one end thereof. Rigidly connected to the enlargement 3 is a pair of upright support bolts 4 that support a coupling block 5 at their upper ends by a pair of nuts 6 and 7. A pressure plate 8 of substantially the same length as the base plate 2 is pivotally connected to the coupling block 5 by a hinge 9.

A pressure adjustment bolt 16 interconnects the other end of the base plate 2 and the pressure plate 8. The lower end of the adjustment bolt 16 is connected to the base plate 2 by an upstanding lug 13. Rigidly connected into the lug 13 is another bolt 14 having a recess or slot 14' in its upper end. The adjustment bolt 16 extends into the recess 14' and is pivotally connected to the bolt 14 by a pivot pin 15. The bolt 16 is laterally extendable into a slot member 12 in the pressure plate 8 and is adjusted by rotating the nut members 18 and 19 positioned above a washer member 17. The upper end of the adjustment bolt 16 is provided with the usual handle 20 so that the bolt may be readily adjusted.

Connected to the undersurface of the pressure plate 8 is a pair of guide rails or bars 11. Intermediate the ends of the pressure plate 8 is mounted a spring member 10 which is positioned between the pair of guide rails or bars 11 and extend from the pressure plate 8 to a top plate member 22 of a sample holding device 50.

The sample holding device 50 is comprised of a pair of legs 21 rigidly mounted on the base plate 2. The legs 21 are secured to a pair of connecting arms 23 by a pivot pin 25 extending through a longitudinally extending slot 24 in the arms 23. The arms 23 are rigidly connected to the top plate member 22 in any suitable manner. At the other end of the top plate 22, an eye member 26 is rigidly secured thereto for a purpose to be hereinafter described.

Rigidly attached to the top plate 22 as by bolts or screws 29 is an upper sample holder 27 which extends longitudinally with respect to the base member 2.

Rigidly connected to the base plate 2 is a lower sample holder 28 which extends transversely across the base plate 2 and is located directly underneath the top sample holder 27.

Since the upper sample holder 27 and the lower sample holder 28 are identical in structure, only one of the members 27 will be described in detail. However, it should be noted that the numerals used to designate the various parts of the sample holder 28 are identical with the numerals used to designate the various parts of the sample holder 27 with the exception that the numerals designating the structure of sample holder 28 have a prime employed therewith.

The sample holder 27 is comprised of a support plate 31 having openings 43 therethrough so that it may be connected to the top plate 22. At one end of said support plate 31 is connected an upstanding lug or plate member 32. Pivotally connected to the upstanding lug 32 by hinge member 33 is a connecting plate 34. Rigidly connected to the plate member 34 is a plurality of rods 35 of a sufficient length to extend from the connecting plate 34 to a support member 36 interconnected to the support plate 31 on the other end thereof. One surface of the support member 36 is provided with a plurality of semi-circular grooves 37 corresponding to the number of rods 35. Pivotally connected to the support member 36 by hinge member 38 is a hold-down plate 39. Connected to the hold-down plate 39 is a hook 40 connected thereto by a screw member 41 which is adapted to be engaged by a hook catch or bolt 42 mounted in support member 36.

As shown, a sample of corrugated board 44 is mounted on the rod members 35 which extend through the flutes 48 in the sample of corrugated board 44.

As shown in FIGURE 3, another type of sample holder 54 is shown. The sample holder 54 is comprised of a support plate 55 having an endwall 56 and a pair of side walls 57 mounted thereon. A pair of longitudinally extending grooves 58 are formed in the wall 57 that are adapted to receive laterally extending lugs 59' on a slidable block member 59. The slidable block 59 is adapted to be moved longitudinally with respect to the support plate 55 but is prevented from being pulled out of the support plate 55 by the lug members 58. The rear end of the slidable block 59 is provided with a bevel surface 60. Behind the slidable block 59 is mounted a hold-down block 61 being provided with a bevel surface 62 that is complementary with the bevel surface 60 on the slidable block 59. The hold-down block is adapted to be connected to the support plate 55 by a bolt member 63 and a wing nut 64.

A sample 65 is placed between the end wall 56 and the slidable block 59. The slidable block 59 is then moved forward in an abutting relationship with the end wall 56 to clamp the sample of plain board 65 therebetween. The board sample 65 is then bent at right angles and extends parallel with the top surface of the slidable block 59. The hold-down block 61 is then moved into an abutting relationship with the slidable block 59, with the sample board 65 between the complementary surfaces 62 and 60. The hold-down block 61 is then connected to the support plate 55 by the bolt 63 and nut 64. The sample holder 54 is aadpted to be connected to the gluability tester unit 1 in the same manner as the sample holders 27 and 28.

In operation, the gluability tester 1 is first placed on a table for easy observation. The bolt 16 is now loosened by loosening nuts 18 and 19, and the bolt 16 is pivoted about pivot pins 15. Pressure plate 8 can now be pivoted on the hinge 9 and extended up into an upright position. The top plate 22 can now be raised and pivoted about pin 25 so that the upper holder 27 is in an upright position away from the lower sample holder 28.

A sample of corrugated board 44 can now be placed on each sample holder 27 and 28 by extending the rods 35 and 35′ through the flutes in the corugated board 44.

A small bead of adhesive is no applied to the sample of corrugated board 44 which is mounted on the lower sample holder 28 using a wire-wound Meyer rod applicator to the proper thickness in a manner well-known in the art.

The rods 35 are now placed into the grooves 37 and locked by the hold-down plate 39 by the hook 40 and hook catcher bolt 42.

The upper sample holder 27 connected to the top plate 22 can now be rotated about pivot pin 25 and placed on top of the bottom sample holder 28 so that an adhesive bond can be formed between the samples of corrugated board 44 at right angles duplicating the action of flaps on shipping containers.

Pressure plate 8 is now rotated about hinge 9 and placed parallel to the base plate 2. The spring 10 comes to rest on top of the top plate 22 and a proper amount of weight can be applied to the top plate 22 by placing the bolt 16 through the slot 12 and adjusting the nuts 18 and 19.

A sufficient amount of time is now given for a bond to be made between the samples on the upper holder 27 and the lower holder 28. After a bond has been made between the two samples in the holders 27 and 28, the pressure adjustment bolt 16 is removed and the pressure plate 8 is again pivoted about hinge 9 to an upright position. A standard suspension spring scale 46 is now inserted through the eye 26. With one hand placed on the base plate 2, the operator can pull on the standard scale 46 and can readily read the amount of force registered on the scale to pull the two samples apart that are mounted on the upper holder 27 and the lower holder 28.

In this manner, the operator can readily demonstrate the gluability properties of container board used in making containers. Moreover, the gluability tester 1 can be formed by any rigid, light-weight plastic material so that it can be readily placed in a case and conveyed from place to place by the operator.

While specific details of preferred embodiments have been set forth above, it will be apparent that many changes and modifications may be made therein without departing from the spirit of the invention. It will therefore be understood that what has been described herein is intended to be illustrative only, and it is not intended to limit the scope of the invention.

What is claimed is:

1. An apparatus for testing the gluability properties of containerboard comprising: a base plate, a pressure plate supported by and spaced above said base plate; an upper holding means mounted below said pressure plate and supported by said base plate adapted to hold a sample of container material; said holding means including a support plate having an end wall and a pair of side walls, grooves formed in each of said side walls, a slidable block having laterally extending lugs that extend into said grooves and abutting said end walls, and a hold-down block rigidly attached to said support plate and engaging said slidable block; said upper holding means extending longitudinally with respect to said base plate; a lower holding means supported by said base plate and adapted to hold another sample of said container material and extending transversely of said base plate and mounted directly below said upper holding means and being identical with said upper holding means; said upper and lower holding means being arranged to hold said samples adjacent each other; and measuring means engageable with said upper holding member for measuring the force to separate two samples of container material adhered to each other and attached to said upper and lower holding means.

2. An apparatus for testing, comprising: a longitudinally extending base plate; a pressure plate supported by and spaced above said base plate including a spring means extending downwardly therefrom; a sample holding means including a pair of leg members rigidly connected to said base plate, a connecting arm pivotally connected to said leg member; a top plate extending longitudinally with respect to said base plate and rigidly connected to said connecting arm and including an eye member connected thereto; an upper sample holder including a support plate rigidly connected to said top plate and extending longitudinally therewith, said support plate including end members rigidly connected thereto, and a plurality of rods extending between said end members and adapted to support a sample of container material; a lower sample holder identical with said upper sample holder rigidly connected to said base plate but extending transversely thereof below said upper sample holder; said spring means extending downwardly from said pressure plate being engageable with said top plate; an adjustment means extending between said base plate and said pressure plate whereby the force exerted by said upper sample holder upon said lower sample holder can be varied by said adjustment means and measuring means engageable with said eye member for measuring the force to separate two container samples adhered to each other and attached to said upper and lower sample holders.

References Cited by the Examiner

UNITED STATES PATENTS

| 2,850,895 | 9/1958 | Mereness et al. | 73—103 |
| 2,968,179 | 1/1961 | Scarvelis | 73—150 X |
| 2,979,944 | 4/1961 | Abbott | 73—150 |
| 3,019,644 | 2/1962 | Mancini | 73—150 |

OTHER REFERENCES

ASTM Standards on Adhesives, 5th ed., December 1961, pages 15, 22.

LOUIS R. PRINCE, *Primary Examiner.*

DAVID SCHONBERG, RICHARD C. QUEISSER,
*Examiners.*